United States Patent [19]

Miyake

[11] Patent Number: 4,708,119

[45] Date of Patent: Nov. 24, 1987

[54] INTERNAL COMBUSTION ENGINE HAVING A MECHANICAL SUPERCHARGER

[75] Inventor: Takashi Miyake, Aichi, Japan

[73] Assignee: Toyota Jidosha Kabushiki Kaisha, Toyota, Japan

[21] Appl. No.: 927,592

[22] Filed: Nov. 6, 1986

[30] Foreign Application Priority Data

Nov. 9, 1985 [JP] Japan .................. 60-249968

[51] Int. Cl.⁴ .............................................. F02B 33/38
[52] U.S. Cl. ................................................... 123/559
[58] Field of Search .................. 60/609; 123/559, 564

[56] References Cited

U.S. PATENT DOCUMENTS

| 4,611,568 | 9/1986 | Onaka et al. | 123/559 |
| 4,656,992 | 4/1987 | Onaka et al. | 123/559 |
| 4,660,526 | 4/1987 | Horii | 123/559 |

Primary Examiner—Michael Koczo
Attorney, Agent, or Firm—Cushman, Darby & Cushman

[57] ABSTRACT

An internal combustion engine including a mechanical supercharger, which is connected to an engine crankshaft via a clutch and selectively turned ON or OFF by controlling the clutch. The supercharger is changed from an OFF to an ON condition only when the engine is running at a speed lower than 5000 rpm and at a load higher than 0.5 liter per one engine revolution, and changed from an ON to an OFF condition only when the engine is running at a speed lower than 4000 rpm and at a load lower than 0.5 l/rev.

5 Claims, 4 Drawing Figures

SOLENOID CLUTCH, OFF to ON

SOLENOID CLUTCH, ON to OFF

INTERNAL COMBUSTION ENGINE HAVING A MECHANICAL SUPERCHARGER

BACKGROUND OF THE INVENTION

1. Field of the Invention

This invention relates to an internal combustion engine, and more particularly to an engine including a mechanical supercharger connected to a crankshaft via a clutch and selectively turned ON or OFF by controlling the clutch.

2. Description of the Related Art

A mechanical supercharger is usually connected to an engine crankshaft via a solenoid clutch, which is controlled to be engaged (turned ON) or disengaged (turned OFF) in accordance with the engine load. Consequently, when the engine is running in a high load condition, the solenoid clutch is turned ON to operate the mechanical supercharger to supplement the air intake. On the other hand, when the engine is running in a low load condition, the solenoid clutch is turned OFF to stop the supercharger and cut off the supplementary air intake.

Thus, in an internal combustion engine including a mechanical supercharger which is turned ON by engaging a solenoid clutch when the engine load (or the opening degree of a throttle valve) is higher than a predetermined value, an improved supercharger has been already proposed in Japanese Utility Model Application No. 59-140365 filed by the applicant (assignee) of this application, in which, when this supercharger is changed from an OFF to an ON condition, the solenoid clutch is periodically controlled so as to prevent an abrupt change in engine torque, unfavorable drivability, and wheel spin.

However, in the mechanical supercharger disclosed in the above-mentioned prior application, the clutch means is subjected to repeated friction, since it is periodically controlled whenever it is changed from an OFF to an ON condition. Therefore, the clutch elements of this supercharger must be made of an endurable and wear-resistant material.

SUMMARY OF THE INVENTION

An object of the present invention is to provide an internal combustion engine having a mechanical supercharger capable of overcoming the disadvantages of the related art.

Another object of the present invention is to provide an internal combustion engine having a mechanical supercharger, which is not changed from an OFF to an ON condition when the engine is running in a driving region such that the rate of torque increase caused by operation of the supercharger is large, to prevent an abrupt torque change which may occur when the supercharger is changed from an OFF to an ON condition, and to prevent an unfavorable drivability, and wheel spin without affecting the durability of the clutch.

According to the present invention, there is provided an internal combustion engine including a mechanical supercharger which is connected to a crankshaft of the engine via a clutch and selectively turned ON or OFF by controlling the clutch, said engine comprising means for detecting a revolutional speed of the engine, means for detecting a load of the engine, means for detecting the ON/OFF condition of the mechanical supercharger, and a control means for changing the mechanical supercharger from an OFF to an ON condition only when the engine is running at a speed that is not more than a first predetermined engine revolutional speed and at a load that is not less than a first predetermined engine load, and changing the supercharger from an ON to an OFF condition only when the engine is running at a speed lower than a second predetermined engine revolutional speed and at a load lower than a second predetermined engine load.

If the engine is running at a speed that is not more than the first and second predetermined engine revolutional speeds, the mechanical supercharger is changed from an OFF to an ON condition to effectively increase the engine torque when the engine load is increased.

If the supercharger is turned OFF and the engine revolutional speed becomes higher than the predetermined speed, the supercharger is not changed from an OFF to an ON condition even if the engine load is increased. Therefore, an abrupt torque change, and thus wheel spin, will not occur. The efficiency of the mechanical supercharger is high when the engine is running at a high speed, and therefore, the rate of torque increase by the supercharger is also high when the engine is running at a high speed.

If, at a low or middle engine speed, the supercharger has been once changed from an OFF to an ON condition, and if the engine then reaches a high speed condition, the supercharger is maintained in an ON condition to effectively continue the supercharging for as long as the engine load condition remains high.

DESCRIPTION OF THE PREFERRED EMBODIMENTS

Figure 1:
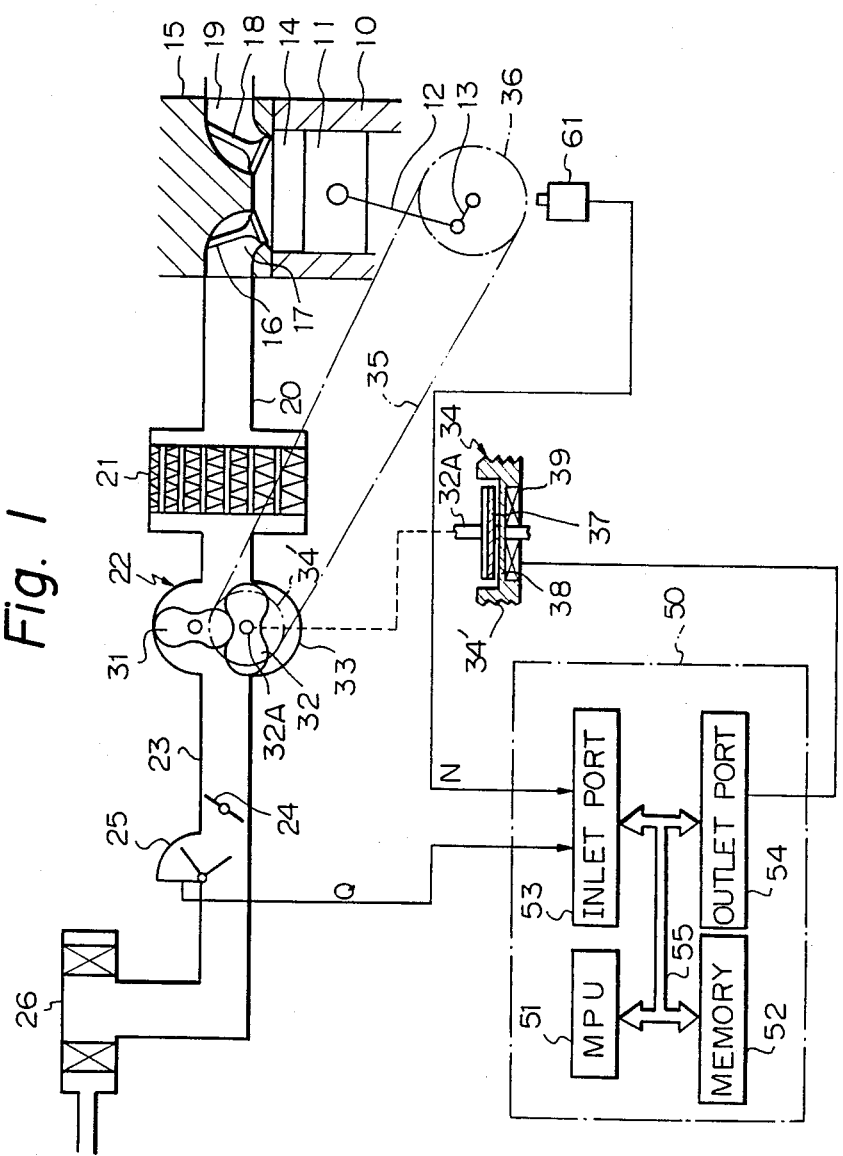
FIG. 1 is a schematic illustration of an internal combustion engine having a mechanical supercharger according to the present invention.

Referring now to FIG. 1, an internal combustion engine according to the present invention comprises an engine cylinder block 10 having cylinder bores 14, in each of which a piston 11 is reciprocally and slidingly disposed to drive an engine crankshaft 13 via a connecting rod 12. A cylinder head 15 is provided for each cylinder with an intake port 17 and an exhaust port 19 which are connected to the engine cylinder 14 via an intake valve 16 and an exhaust valve 18, respectively. The intake port 17 is also connected via an intake pipe 20, an intercooler 21, and a mechanical supercharger 22 to a throttle body 23. An air passage of the throttle body 23 is provided therein with a throttle valve 24, and an air flow meter 25 and an air cleaner 26 are arranged upstream thereof. The intercooler 21 serves to increase the volume efficiency of intake air by cooling the inlet air, which has been pressurized by the mechanical supercharger 22 and, therefore, the temperature thereof has been increased.

The mechanical supercharger 22 is positioned downstream of the throttle valve 24, but upstream of the intercooler 21. The mechanical supercharger 22 comprises, in this embodiment, a Roots-type pump including a pair of rotors 31 and 32, which synchronously and cooperatively rotate in a pump housing 33. A pulley 34' is rigidly mounted on a rotating shaft 32A of one of the rotors 32 via a clutch means 34 and operatively connected via a belt 35 to a pulley 36 rigidly mounted on the crankshaft 13. As schematically illustrated in FIG. 1, the clutch means 34 is a solenoid clutch, for instance, comprising a pair of friction disks 37 and 38 and a solenoid 39. These friction disks 37 and 38 are engaged with each other by energizing the solenoid 39. One of the friction disks 37 is connected to the rotating shaft 32A. On the other hand, the other friction disk 38 is freely rotatably mounted on the housing and is formed at its outer periphery with the above-mentioned pulley 34'.

A microcomputer 50 serves as a control system for controlling the clutch means 34. The control system 50 comprises a microprocessing unit (MPU) 51, a memory 52, an inlet port 53, an outlet port 54, and a bus 55 for mutually connecting these elements, Signals from various sensors are input to the inlet port 53. For instance, a signal representing the flow of inlet air (Q) is sent from the air flow meter 25, and a signal representing a revolutional speed NE (N) of the crank shaft 13 is sent from a revolution sensor 61. A control signal for energizing the solenoid 39 of the clutch means 34 is output from the outlet port 54 in accordance with the control program loaded in the memory 52.

Figure 2:
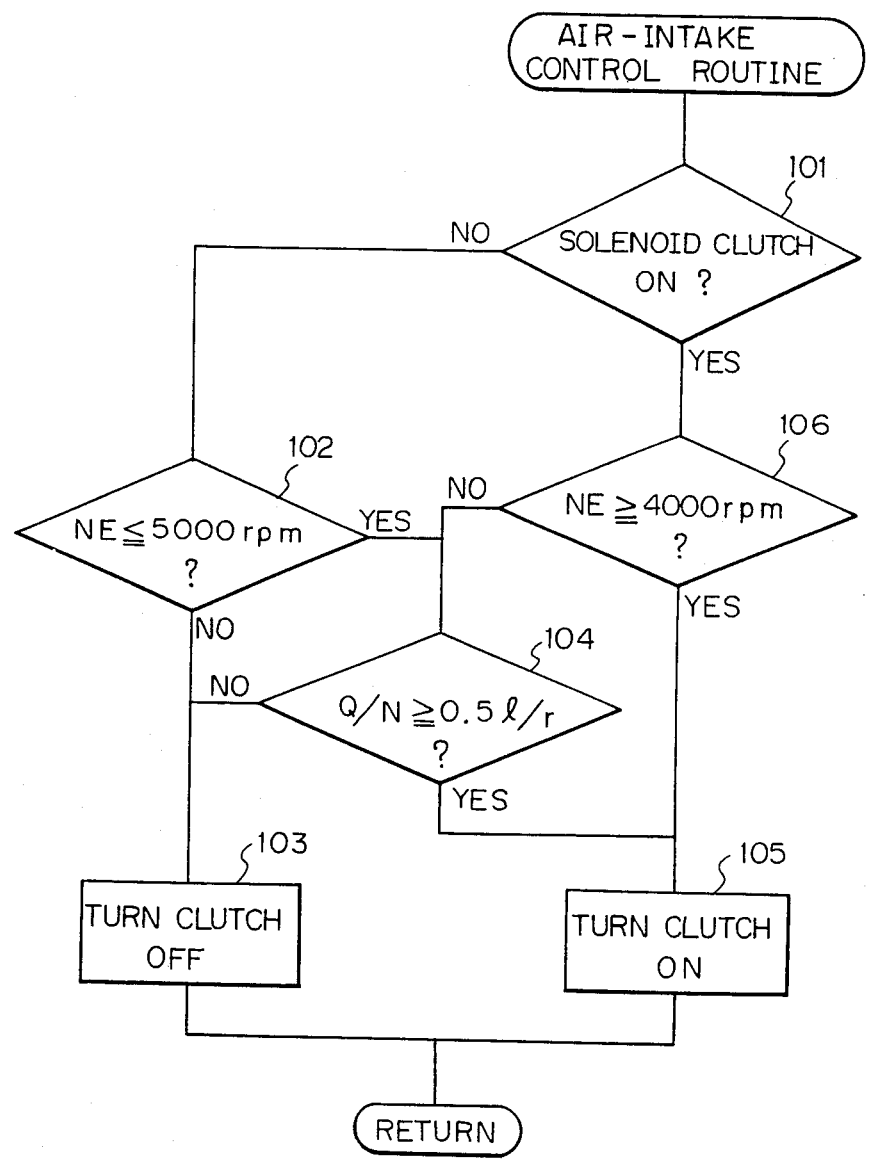
FIG. 2 is a flow chart for illustrating the control process of the mechanical supercharger of this invention; and, FIGS. 3 and 4 are diagrams for illustrating the control regions of the mechanical supercharger of this invention.

FIG. 2 is a flow diagram of a drive routine, being executed at an interruption made at a predetermined time, for instance, 4 m seconds, for energizing the clutch means 34. At step 101, it is determined whether or not the supercharger 22 is now turned ON, i.e., whether the solenoid clutch 34 is now engaged (ON) or disengaged (OFF). If the solenoid clutch 34 is in an OFF condition, then at step 102, it is determined whether or not the engine revolutional speed NE is not more than a predetermined value, for example, 5000 rpm. If the engine revolutional speed NE is more than, for example, 5000 rpm, then at step 103 an instruction for deenergizing the solenoid clutch 34 is given from the outlet port 54. Accordingly, the clutch friction disks 37 and 38 are mutually disengaged, so that the rotation of the crankshaft 13 is not transmitted to the rotors of the supercharger 22 and the supplementary air intake is cut off. At step 102, if the engine revolutional speed NE is not more than e.g., 5000 rpm, then at step 104 it is determined whether or not Q/N (here, Q: the flow of inlet air, and N: engine revolutional speed) representing the engine load is not less than a predetermined value, for example, 0.5 liter per one engine revolution. If Q/N is less than, e.g., 0.5 1/rev., then at step 103 an instruction for deenergizing the solenoid clutch 34 is given from the outlet port 54 and the supplementary air intake is cut off in the same manner as above. If, at step 104, Q/N is not less than, e.g., 0.5 1/rev., then at step 105 an instruction for energizing the solenoid clutch 34 is given from the outlet port 54. Accordingly, the clutch friction disks 37 and 38 are mutually engaged, so that the rotation of the crankshaft 13 is transmitted via the pulley 36, the belt 35, and the pulley 34' to the rotating shaft of the supercharger 22 to rotate the rotors 31 and 32 to effect an air intake supplement.

Figure 3:
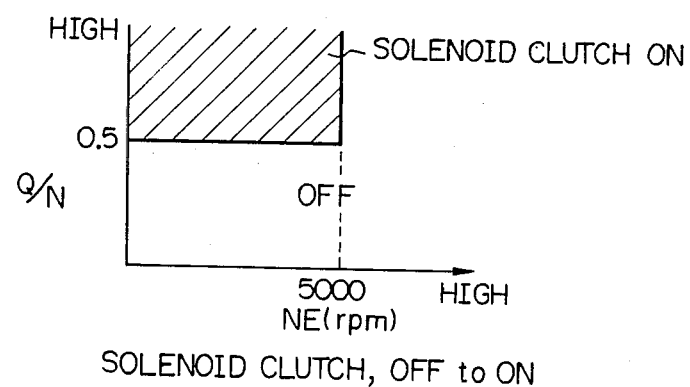

As mentioned above, the condition for changing the solenoid clutch to an OFF condition, to cut off the supplementary air intake, an ON condition to effect the supplement air intake, as illustrated in FIG. 3, occurs only when the engine revolutional speed (NE) is not more than the predetermined value (e.g., 5000 rpm) and the engine load (Q/N) is not less than the predetermined value No. 3 (e.g., 0.5 1/rev.). If the engine revolutional speed (NE) becomes over the predetermined value (e.g., 50000 rpm) the solenoid clutch 34 is not changed from an OFF to an ON condition regardless of the engine load (Q/N).

When the supercharger 22 is in operation, i.e., when the solenoid clutch 34 is turned ON and the discrimination at step 101 is Yes, then at step 106 it is determined whether or not the engine revolutional speed NE is less than a predetermined value, for example, 4000 rpm. If the engine revolutional speed NE is less than e.g., 4000 rpm, then at step 104 the solenoid clutch 34 is controlled in accordance with the engine load (Q/N), in the same manner as mentioned above. That is to say, if the engine load (Q/N) is not less than e.g., 0.5 1/rev., the solenoid clutch 34 is maintained in an ON condition, and on the other hand, if the engine load (Q/N) is less than e.g., 0.5 1/rev., the solenoid clutch 34 is turned OFF. If, at step 106, the engine revolutional speed NE is not less than, e.g., 4000 rpm., then at step 5 the solenoid clutch 34 is maintained in an ON condition.

Figure 4:
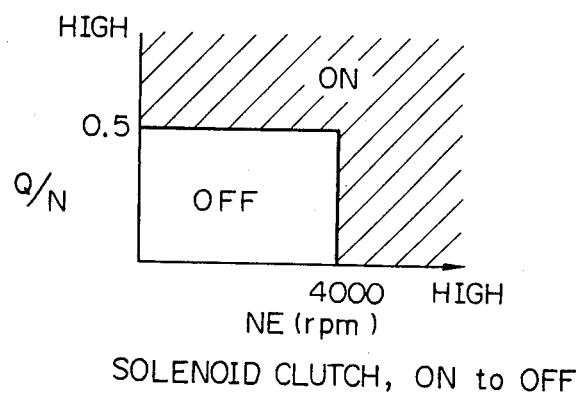

As mentioned above, the condition for changing the solenoid clutch from an ON condition to supplement the air intake, to an OFF condition to cut off the air intake supplement, as illustrated in FIG. 4, occurs only when the engine revolutional speed (NE) is not more than the predetermined value (e.g., 4000 rpm) and the engine load (Q/N) is less than the predetermined value (e.g., 0.5 1/rev.). When the engine revolutional speed (NE) is more than, e.g., 4000 rpm, the solenoid clutch 34 is maintained in an ON condition, even if the engine load (Q/N) becomes lower.

What is claimed:

1. An internal combustion engine including a mechanical supercharger, which is connected to a crankshaft of the engine via a clutch and selectively turned ON or OFF by controlling the clutch, said engine comprising means for detecting a revolutional speed of the engine, means for detecting a load of the engine, means for detecting the ON/OFF condition of the mechanical supercharger, and a control means for changing the mechanical supercharger from an OFF to an ON condition only when the engine is running at a speed that is not more than a first predetermined engine revolutional speed and at a load that is not less than a first-predetermined engine load, and changing the supercharger from an ON to an OFF condition only when the engine is running at a speed lower than a second predetermined engine revolutional speed and at a load lower than a second predetermined engine load.

2. An internal combustion engine as set forth in claim 1, wherein said first predetermined engine revolutional speed is higher than said second predetermined engine revolutional speed.

3. An internal combustion engine as set forth in claim 2, wherein said first engine speed is about 5000 rpm and said second engine speed is about 4000 rpm.

4. An internal combustion engine as set forth in claim 1, wherein said first predetermined engine load is substantially the same as said second predetermined engine load.

5. An internal combustion engine as set forth in claim 4, wherein said first and second engine load is about 0.5 liter per one engine revolution.

* * * * *